Sept. 23, 1969   G. VAL   3,468,197
APPARATUS FOR THE PRODUCTION OF ROUND OPENINGS IN WORKPIECES
Filed Dec. 22, 1966   3 Sheets-Sheet 1
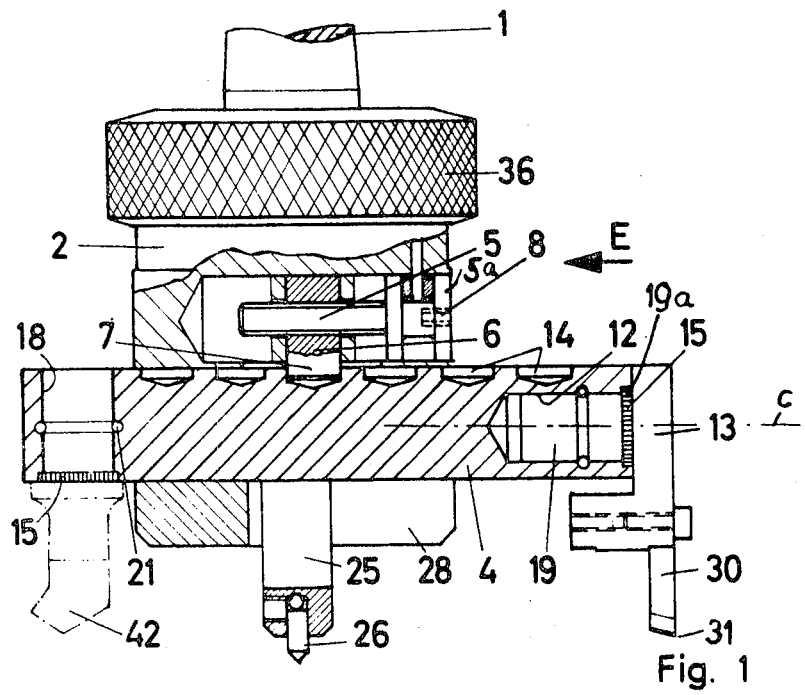
Fig. 1
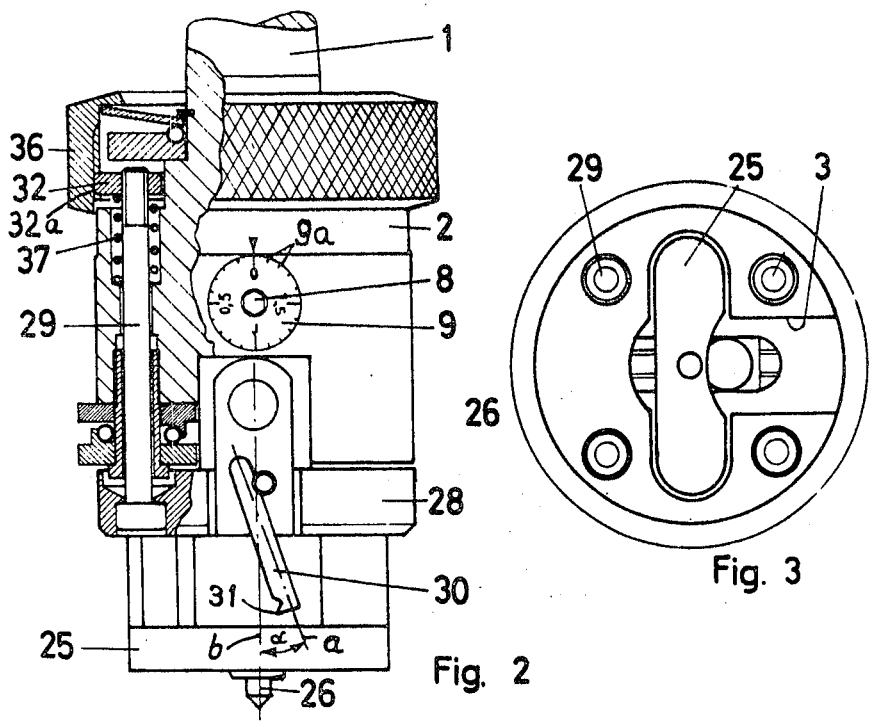
Fig. 2
Fig. 3
INVENTOR
George Val
BY Jacobi & Davidson
Attorneys Sept. 23, 1969     G. VAL     3,468,197
APPARATUS FOR THE PRODUCTION OF ROUND OPENINGS IN WORKPIECES
Filed Dec. 22, 1966     3 Sheets-Sheet 2

INVENTOR
GEORGE VAL
BY Jacobi & Davidson
Attorneys

Sept. 23, 1969  G. VAL  3,468,197
APPARATUS FOR THE PRODUCTION OF ROUND OPENINGS IN WORKPIECES
Filed Dec. 22, 1966  3 Sheets-Sheet 3
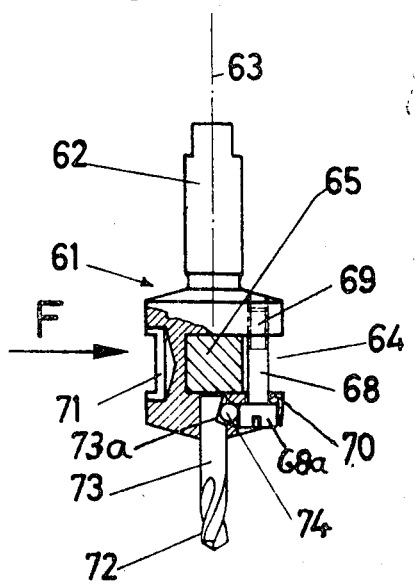
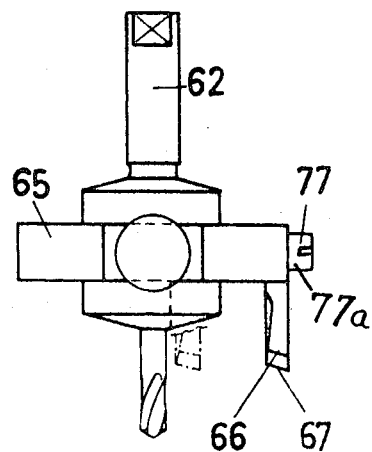
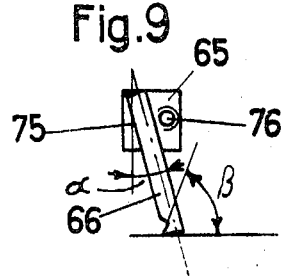
INVENTOR
George Val
BY Jacobi & Davidson
Attorneys United States Patent Office 3,468,197
Patented Sept. 23, 1969

3,468,197
APPARATUS FOR THE PRODUCTION OF ROUND OPENINGS IN WORKPIECES
George Val, Dallikon, Switzerland
Filed Dec. 22, 1966, Ser. No. 603,956
Claims priority, application Switzerland, Dec. 24, 1965, 17,829/65; Apr. 15, 1966, 5,499/66
Int. Cl. B23b *41/00*
U.S. Cl. 77—79         17 Claims

ABSTRACT OF THE DISCLOSURE

An apparatus for the formation of round holes or openings in workpieces wherein the tool holder supports a cutting tool at a desired inclination with respect to the working direction of rotation and the cutting angle of such cutting tool is positive. The tool holder is selectively positionable for proper accommodation of the cutting tool and mechanism is provided for this purpose. Also, the apparatus incorporates a specially resiliently mounted hold-down or press pad, and such apparatus can carry out different machining operations, as desired.

Background of the invention

The present invention has reference to an improved apparatus for the production of substantially round or circular openings or holes in workpieces by means of at least one machining or metal removal cutting tool insert.

The forming of grooves with the aid of circular cutting devices for the production of openings in plates or, even, for the manufacture of disks is associated with difficulties since with certain metal alloys the cutting tool has the tendency of hooking in and breaking off. In this regard, it should be appreciated that these difficulties become more pronounced with increasing depth of the groove. Indeed, numerous proposals for improving such cutting devices have been advanced and experiments performed, particularly by varying the different angles at the cutting edge, yet without any perceivable success.

Summary of the invention

Accordingly, it is a primary object of the present invention to provide an improved apparatus which enables producing deep grooves in workpieces at high machining or metal removal efficiencies.

Another, more specific object of the present invention is directed to an improved apparatus which effectively brings about the cutting of substantially round openings or holes in workpieces, wherein the apparatus itself is of relatively simple construction, operating at high metal removal efficiencies, extremely robust and economical to manufacture, and easy to use.

Still a further significant object of this invention is directed to an improved apparatus for the production of round openings in workpieces wherein the cutting tool is mounted in a manner to prevent it from hooking in or breaking off at the workpiece.

Generally speaking, and according to one important aspect of the invention, the longitudinal axis of the cutting tool insert is inclined rearwardly from the clamping location of a holder and with respect to the working direction of rotation, and the cutting angle of the cutting edge is positive in known manner.

Owing to this measure it is possible to provide a tool which is extremely suitable for machining or the working of metal and by means of which surprisingly deep grooves can be produced in very short time, even in materials which are difficult to work, and without the danger of tool breakage.

Brief description of the drawings

The invention will be better undersood, and objects other than those set forth above, will become apparent, when consideration is given to the following detailed description thereof. Such description makes reference to the annexed drawings disclosing a number of embodiments of the present inventive subject matter applied to a circular cutting apparatus and wherein:

FIGURE 1 is a fragmentary front view of a first embodiment of the invention, partly in section;

FIGURE 2 depicts the apparatus as viewed in the direction of the arrow E of FIGURE 1, and again partly in section;

FIGURE 3 is a bottom view of the apparatus depicted in FIGURE 1, with the holder removed;

FIGURE 7 is a side view of a simpler embodiment of inventive circular cutter, partly in cross-section;

FIGURE 8 is a view of the circular cutter of FIGURE 7 seen in the direction of arrow F of FIGURE 7; and FIGURE 9 is a front view of the tool holder in conjunction with the groove cutter.

Description of the preferred embodiments

Figures 4, 5:
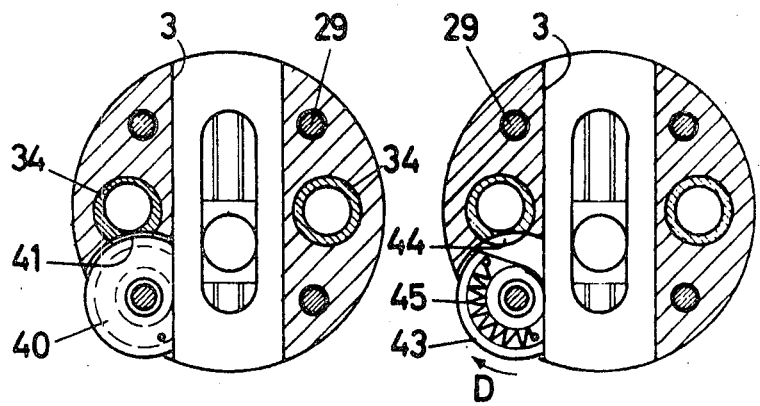
FIGURE 4 is a cross-sectional view of the apparatus of FIGURES 1 and 2, taken along the line B—B of FIGURE 6.
FIGURE 5 is a cross-sectional view of the apparatus depicted in FIGURES 1 and 2, taken along the line A—A of FIGURE 6.

Describing now the drawings, and before going into detail on the specific structural features of the various inventive embodiments, it is to be understood that one of the main underlying principles forming the basis of the invention is that, in a circular cutting device or the like the cutting tool is inclined rearwardly with respect to its clamping location or, in other words, viewed from the cutting edge of the cutting tool, is inclined forwardly in the direction of rotation. In so doing, the cutting tool is ground such that the cutting angle remains positive. The angle of inclination $\alpha$ of the cutting tool 30, typically a steel tool, with respect to a plane taken through the axis of rotation $b$ and the holder axis $c$ amounts to about 2° to 45°, preferably about 13° to 17°, and is dependent upon the material to be machined and the depth of the groove. The cutting edge 31 is situated behind a plane defined by the axis of rotation $b$ and the longitudinal axis $c$ of the holder means 4, so that it is actually possible to speak in terms of a trailing cutter. When forming a groove the forces which appear during metal removal or machining attempt to pivot the tool away from the cutting location, and consequently, to reduce the cutting depth. As a result, the holder means is subjected to torsion and has the tendency of twisting, thereby lifting away from the cutting location, when the cutting resistance increases. In this manner it has surprisingly been found possible to form deep grooves, and indeed, also in materials the machining of which is difficult.

The thus produced turning has the tendency of arching in cross-section, so that it can easily move out of the groove without becoming stuck. It is possible, for instance, to cut groove depths in steel up to 35 millimeters and with a diameter of 250 millimeters, by means of a cutting tool formed from a quadrangular or square blank of 6 millimeters edge length. If the work is turned over and machined at the oposite side it is therefore possible to produce cylindrical openings or bores in plates or the like up to 70 millimeters thickness or depth.

Turning now more specifically to the drawings, and considering first the embodiment of FIGURES 1 to 6, it will be recognized that the exemplary embodiment of circular cutting or boring apparatus incorporates a cone 1 by means of which this apparatus can be mounted at the spindle of a bore or milling machine for instance. This cone 1 together with the head 2 forms an integral piece. At the lower region of this head 2 there is provided a substantially trough-shaped recess 3 in which there can be mounted for longitudinal displacement a quadrangular or square holder means 4. This holder means 4 can be displaced in a direction transverse to the axis of rotation $b$ of the apparatus through the agency of a threaded spindle 5 for instance. To this end, there is provided a threaded nut 6 having a substantially pin-shaped, downwardly extending shoulder 7, which engages with a recess or depression 14, of which a number of such recesses 14 are provided in the form of a longitudinal row at the upper surface of the holder means 4.

Threaded spindle 5 piercingly extends through this threaded nut 6 and is provided at its head portion 5a with a hollow hexagonal setscrew 8 and is surrounded externally by a graduated disk 9. The degree of adjustment can be read off by means of the scale divisions or graduations 9a applied to the face of the aforesaid graduated disk 9. It will further be recognized that at one end of the holder means 4 there is located a bore 12 which extends in axial direction and into which there is set a pin member 19. This pin member 19 extends from an insert piece 13 which, in turn, is provided with a suitable depression or recess for the reception of an appropriate slot or groove cutter 30. As best seen by referring to FIGURE 2, the longitudinal axis $a$ of this groove cutter 30—viewed from the cutting edge 31—is inclined forward, in other words in the direction of rotation, and possesses a positive cutting angle. At the root of the pin member 19 there are located serrations 15 which are designed to cooperate with counterserrations 19a at the edge of the bore 12 of the holder means 4, to permit a fine angular adjustment of the insert piece 13 and thereby of the groove cutter 30.

Continuing, the holder means 4 is provided at its opposite end with a bore 18 which extends substantially transverse to a plane containing the longitudinal axis of the bore 12. Bore 18 is likewise provided with serrations or teeth 15. A suitable reamer or borer 42 can be introduced into this bore 18 and retained in the inserted position by means of a securing ring 21 or equivalent structure. Consequently, the same holder means 4 can be selectively employed not only for circular cutting work or for the punching out of grooves, but also for the turning out of cylindrical bores.

By inspecting FIGURE 2 it will be noticed that for the purpose of enabling the apparatus to be easily centered relative to the workpiece there is provided a resilient hold-down mechanism or press pad 25 at the lower end of which there is centrally introduced a rotatably supported point 26. Instead of this point or tip member 26 it is also possible to introduce a short drill or borer 35, as best seen by referring to FIGURE 6. The hold-down member or press pad 25 which is attachable as a unit or entity is held for axial displacement by two spring members 27 in the guide sleeves 34. These springs 27 are supported at the top by means of a pressure plate 48 retained for up and down movement. A plate spring 49 is situated above the pressure plate 48, and this plate spring bears at the inside against a snap ring 50 and at the outside upon a shoulder 51 of the clamping nut 36.

Figure 6:
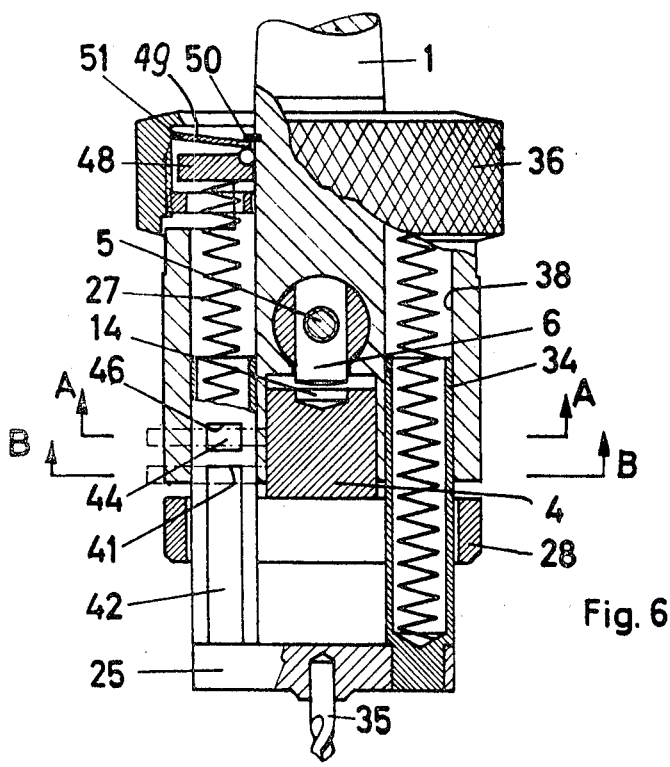
FIGURE 6 is a longitudinal sectional view through the apparatus of FIGURES 1 and 2, the holder being shown in the disengaged or unlocked position.

Further, it will be understood that the substantially trough-shaped recess 3 is bounded at its bottom or lower end by means of a clamping plate 28 which is secured by shoulder studs or screws 29 to a tensioning or tightening ring 32 arranged at the upper portion of the head 2. This tightening ring 32 is externally provided with threading 32a engaging with the threadably attached clamping nut 36, so that upon rotation of this clamping nut 36 the tightening ring 32 can be displaced in axial direction. In this manner, by appropriately rotating the clamping nut 36 it is possible to press, with a balancing of the pressure or forces, the clamping plate 28 against the lower face of the holder means 4 with the help of the shaft screws 29. On the other hand, rotation of this clamping nut 36 in the opposite direction causes the clamping plate 28 to move downwardly under the action of the pressure springs 37, whereby there is rendered possible disengagement of the projection 7 from the momentarily engaged recess 14. As a result, the holder means 4 can be displaced in axial direction and can be locked by means of the projection 7 in a different desired recess 14. In FIGURE 6 the nut 6 and the associated projection thereof as well as the holder means 4 are shown in their disengaged position, whereas in FIGURE 1 these components or elements engage with one another.

Now, by referring to FIGURE 4 it will be recognized that in order to prevent the sleeve members 34 of the hold-down member 25 from being pushed out of the associated bores 38 under the action of the springs 27 there is provided an arresting disk 40 which bears against a shoulder 41 at the jacket of the associated sleeve member 34. This shoulder 41 is formed at the transition of a milled surface 42 which extends downwardly from the shoulder 41, so that the hold-down member 25 can be displaced in axial direction, from the position shown, towards the top while overcoming the pressure of the springs 27. FIGURE 5 further shows that a second arresting disk 43 is located in substantially coaxial arrangement above the previously considered arresting disk 40 and cooperates with a milled surface 44 at the jacket of the associated sleeve 34. This arresting disk or plate 43 is constructed substantially in the form of a ring segment, as shown, and is equipped at the inside with a spring 45 which strives to press this arresting disk 43 in the terminal position depicted in FIGURE 5. Prior to begining the work or machining operation this arresting disk 43 is pivoted in the direction of the arrow D, so that it arrives at the zone of the milled surface or recess 44 and is held at this location solely by the friction or clamping action at the shoulder 46 limiting the aforesaid milled surface or recess 44 at the top as long as there appears a counter-pressure (drilling or boring pressure) exerted by the hold-down member 25.

This arresting mechanism is then employed when initially a centering hole should be bored by means of the drill or bore 35, so that during the drilling operation there is prevented an axial retraction of the hold-down member 25. This temporary arresting action takes place via the arresting disk 43 which, as previously explained, is pivoted in the direction of the arrow D and fixedly held in this arresting position, whereupon the entire apparatus is moved downwardly until the tip of the drill 35 comes to bear against the workpiece. Since the spring 45 only exerts a slight pressure in the direction opposite the direction of the arrow D, the clamping action exerted by the shoulder 46, bounding the recess 44, at the front face of the arresting disk 43 is sufficient to prevent the latter from pivoting back into its initial position. As soon as drilling of the hole has been completed the previously present axial pressure at the arresting disk 43 terminates with the passage of the drill 35 through the workpiece and, consequently, such arresting disk 43 moves out of contact or engagement with the shoulder 46 in that said arresting disk rotates in the direction opposite the arrow D. Thereafter, without changing any tools it is possible to cut a groove in the workpiece by means of the groove cutter 30 which has previously been placed in the correct position, whereby then the hold-down member 25 retracts with increasing penetration depth of the groove cutter 30 in that the sleeve members 34 have the tendency of telescopically entering the associated bores 38 more and more.

FIGURES 7 to 9 illustrate a circular cutter of somewhat simpler construction than that of the previous embodiment. This circular cutter possesses a head 61 which together with a shaft 62 is formed of a single piece of steel material. Shaft 62 is adapted to be clamped into the drill chuck of a drill machine or the like, so that the entire circular cutter can rotate about the axis of rotation 63. Transverse to this axis of rotation 63 and at the head 61 there is provided a laterally open groove 64. This groove or recess 64 serves for the reception of a tool holder 65 which can be displaced in radial direction with respect to the axis of rotation 63. At one end of this tool holder 65 there is disposed a groove cutter 66 having a cutting edge 67. The holder or holder means 65 is fixedly clamped in this groove 64 by means of a threaded screw 68 or equivalent structure which extends substantially parallel to the rotational axis 63, and specifically, owing to the fact that by virtue of this screw 68 it is possible to somewhat reduce the width of the holder groove 64, so that the holder 65 is fixedly clamped in this groove 64. More specifically, for this purpose there is provided at the upper portion of the head 61 a threading 69 and at the lower head portion a shoulder 70 for the screw head 68a. In order to insure that the force required of the screw 68 for the resilient deformation of the material does not become too large a hole or recess 71 is bored or otherwise formed at the side of the head 61 opposite the groove 64. This hole or recess at the same time prevents or at least reduces any imbalance which might occur during high rotational speeds.

At the lower end of the head 61 opposite the shaft 62 there is disposed a short drill or borer 72 having a cylindrical rear shaft portion 73. This drill or borer 72 extends coaxially with regard to the axis of rotation 63 and carries at the shaft portion 73 a beveled or inclined surface 73a designed to cooperate with a ball 74. This ball or sphere 74 is pushed into the inclined surface 73a by the head 68a of the screw 68, so that upon tightening of the screw 68 the drill 72 is simultaneously fixedly retained.

The cutting tool 66 is rearwardly inclined with regard to the working direction of rotation, and specifically, at an angle $\alpha$ of 10° to 20°, preferably 13° to 17°, in other words, the tool is again trailed. Moreover, this groove cutter or tool 66 is likewise provided with a positive cutting angle and is laterally back-slope ground so that it does not rub against the wall of the groove. Under the term "positive cutting angle" as employed herein there is to be understood that the angle $\beta$ is less than 90°, in other words, there is not present any so-called negative cutting edge. The cutting tool preferably exhibits a twist so that the groove depth can be selected to be relatively large, without the cutting tool becoming weakened too much in the zone of its clamping location. This cutting tool 66 is fixedly clamped by means of the screw head 77a of the screw 77 threaded into the threaded bore 76. Owing to this construction the cutting tool 66 can be easily exchanged. By virtue of the inclination of this cutting tool 66 there is provided for such a resilient action in that, during the cutting operation, it can deviate or deflect towards the rear, whereby the holder means 65 is subjected to torsion.

This cutting apparatus can preferably be employed for machining metals, such as steel, but also for some plastics such as acrylglass.

Under the terms "tool" or "groove cutter" or "cutting-off or recessing tool" there is to be understood tool inserts which, for instance, are completely or partially formed of materials other than steel, for instance of hard metals or ceramic materials as such as known to the art for other metal removal or machining tools. Moreover, in place of a single cutter insert it will also be possible to provide machining tools with a number of cutter inserts which are simultaneously in action.

It should be apparent from the foregoing detailed description, that the objects set forth at the outset to the specification have been successfully achieved. While there is shown and described present preferred embodiments of the invention it is to be distinctly understood that the invention is not limited thereto but may be otherwise variously embodied and practiced within the scope of the following claims.

What is claimed is:

1. In an apparatus for the formation of round holes in workpieces, the combination of tool holder means, at least one elongate material removal cutting tool carried by said tool holder means, said cutting tool having a longitudinal axis which extends rearwardly of the clamping location of said tool holder means with respect to the working direction of rotation, said cutting tool being provided with a cutting edge possessing a positive cutting angle, said cutting edge of said cutting tool being situated rearwardly, with respect to said working direction of rotation, of a plane formed by the axis of rotation and the longitudinal axis of said tool holder means.

2. In an apparatus as defined in claim 1, wherein said cutting edge of said cutting tool is situated rearwardly, with respect to said working direction of rotation, of a plane formed by the axis of rotation and the rearmost point of the clamping location.

3. In an apparatus as defined in claim 1, wherein said combination is constructed as a circular cutting device, said tool holder means being displaceably mounted in a direction substantially transverse to the feed direction of said cutting tool.

4. In an apparatus as defined in claim 1, wherein the longitudinal axis of said cutting tool is inclined with respect to the axis of rotation at least at an angle of 5 degrees.

5. In an apparatus as defined in claim 4, wherein said angle of inclination lies in the range of about 10 to 20 degrees.

6. In an apparatus as defined in claim 1, wherein said cutting tool is detachably carried by said tool holder means, said tool holder means being further provided with at least one bore means for the reception of a reaming tool.

7. In an apparatus for the formation of round holes in workpieces, the combination of tool holder means, at least one elongate material removal cutting tool carried by said tool holder means, said cutting tool having a longitudinal axis which extends rearwardly of the clamping location of said tool holder means with respect to the working direction of rotation, said cutting tool being provided with a cutting edge possessing a positive cutting angle, a displaceably mounted threaded nut and an adjusting spindle engaging with said threaded nut, said tool holder cooperating with said displaceably mounted threaded nut and adjusting spindle, a releasable engaging member located between said threaded nut and said tool holder means.

8. In an apparatus as defined in claim 7, wherein said releasable engaging member is a shoulder provided at said threaded nut.

9. In an apparatus as defined in claim 1, further including a detachable hold-down member.

10. In an apparatus for the formation of round holes in workpieces, the combination of tool holder means, at least one elongate material removal cutting tool carried by said tool holder means, said cutting tool having a longitudinal axis which extends rearwardly of the clamping location of said tool holder means, with respect to the working direction of rotation, said cutting tool being provided with a cutting edge possessing a positive cutting angle, said tool holder means having an end face provided with a tool holder bore having serrations, an intermediate insert member located at said end face, said intermediate insert member being provided with a pin member engaging with said tool holder bore, said intermediate insert member having a groove for the reception of said cutting tool.

11. In an apparatus for the formation of round holes in workpieces, the combination of tool holder means, at least one elongate material removal cutting tool carried by said tool holder means, said cutting tool having a longitudinal axis which extends rearwardly of the clamping location of said tool holder means with respect to the working direction of rotation, said cutting tool being provided with a cutting edge possessing a positive cutting angle, said tool holder means having an upper side provided with a series of similar recess means, an adjusting nut having a projection tightly selectively fitting into a given one of said series of recess means for enabling displacement of said tool holder means in its longitudinal direction and for fixing said tool holder means in desired position, a detachably secured clamping plate for fixedly retaining said tool holder means at its bottom.

12. In an apparatus as defined in claim 11, further including a tightening ring, means for operatively connecting said clamping plate with said tightening ring, clamping nut means provided with threading for axially displacing said tightening ring so that said tool holder means can be selectively engaged and disengaged.

13. In an apparatus as defined in claim 11, further including a resiliently mounted hold-down member, drill means provided for said hold-down member, and arresting means for preventing the return biasing of said hold-down member, said arresting means disengaging upon unloading of said drill means.

14. In an apparatus as defined in claim 13, further including at least two guide members provided for said hold-down member, one of said guide members having a shoulder, said arresting means incorporating a pivotably mounted, spring-loaded arresting disk cooperating with said shoulder, said arresting disk being fixedly retained in an engaged position with said shoulder solely through the clamping action brought about by the pressure of said drill means.

15. In an apparatus for the formation of round holes in workpieces, the combination of tool holder means, at least one elongate material removal cutting tool carried by said tool holder means, said cutting tool having a longitudinal axis which extends rearwardly of the clamping location of said tool holder means with respect to the working direction of rotation, said cutting tool being provided with a cutting edge possessing a positive cutting angle, a head member for supporting said tool holder means, a securing means carried on said head member, said head member and securing means being formed of a single piece, said head member having a groove for receipt of said tool holder means, screw means for altering the width of said groove so that said tool holder means can be fixedly retained in said head member solely by virtue of a clamping action.

16. In an apparatus as defined in claim 15, wherein said securing means is an attachment shaft.

17. In an apparatus as defined in claim 15, further including drill means carried by said head member, said screw means for altering the width of said groove extending substantially parallel to the axis of rotation, said screw means having a screw head for fixedly clamping said drill means.

References Cited
UNITED STATES PATENTS 2,406,442  8/1946  Smith _____ 77—79

FOREIGN PATENTS 346,689  1/1922  Germany.

FRANCIS S. HUSAR, Primary Examiner

U.S. Cl. X.R.

145—121